(12) United States Patent
Olesen et al.

(10) Patent No.: US 9,808,888 B2
(45) Date of Patent: Nov. 7, 2017

(54) LASER SYSTEM AND METHOD THEREOF

(71) Applicant: GENTEX CORPORATION, Zeeland, MI (US)

(72) Inventors: Niels A. Olesen, Zeeland, MI (US); David A. Bender, Holland, MI (US); Donald L. Bareman, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 413 days.

(21) Appl. No.: 14/452,446

(22) Filed: Aug. 5, 2014

(65) Prior Publication Data

US 2015/0034616 A1 Feb. 5, 2015

Related U.S. Application Data

(60) Provisional application No. 61/862,233, filed on Aug. 5, 2013, provisional application No. 61/974,508, filed on Apr. 3, 2014.

(51) Int. Cl.

| | |
|---|---|
| *B23K 26/00* | (2014.01) |
| *B23K 26/38* | (2014.01) |
| *B23K 26/08* | (2014.01) |
| *G02B 26/10* | (2006.01) |
| *B23K 26/064* | (2014.01) |
| *B23K 26/0622* | (2014.01) |
| *B23K 26/28* | (2014.01) |

(52) U.S. Cl.
CPC ............ *B23K 26/38* (2013.01); *B23K 26/064* (2015.10); *B23K 26/0622* (2015.10); *B23K 26/0884* (2013.01); *B23K 26/28* (2013.01); *G02B 26/105* (2013.01)

(58) Field of Classification Search
CPC .. B23K 26/0622; B23K 26/38; B23K 26/064; B23K 26/0884; B23K 26/28; G02B 26/105
USPC ...................................................... 219/121.72
See application file for complete search history.

(56) References Cited

U.S. PATENT DOCUMENTS 6,483,071 B1 * 11/2002 Hunter ................... B23K 26/04
219/121.6
6,674,045 B2    1/2004 Iwase et al.
(Continued)

FOREIGN PATENT DOCUMENTS

| | | |
|---|---|---|
| EP | 2076354 B1 | 11/2011 |
| JP | 2003110218 A | 4/2003 |

OTHER PUBLICATIONS

International Preliminary Report on Patentability in PCT/US2014/049830 dated Feb. 18, 2016 (6 pages).

(Continued)

*Primary Examiner* — Christopher Kim
*Assistant Examiner* — Adam J Rogers
(74) *Attorney, Agent, or Firm* — Foley & Lardner LLP; Bradley D. Johnson

(57) ABSTRACT

A laser system includes a laser configured to emit pulse bursts and a motion device in optical communication with the laser. The motion device moves a laser beam along a process path on a substrate and is configured to have a natural frequency that is greater than an operating frequency of the laser system. The laser system enables high and constant speed processing along tight radii in the process path, which is useful to form laser induced channels along the process path with equal spacing.

20 Claims, 2 Drawing Sheets

(56) References Cited

U.S. PATENT DOCUMENTS

| | | | |
|---|---|---|---|
| 7,602,540 B2 | 10/2009 | Masuda et al. | |
| 8,842,358 B2 | 9/2014 | Bareman et al. | |
| 2006/0191884 A1* | 8/2006 | Johnson | B23K 26/04 219/121.85 |
| 2006/0192845 A1* | 8/2006 | Cordingley | B23K 26/032 347/252 |
| 2009/0086300 A1* | 4/2009 | Blake | G06K 7/10653 359/199.1 |
| 2009/0095722 A1* | 4/2009 | Ehrmann | B23K 26/06 219/121.72 |
| 2010/0246611 A1* | 9/2010 | Sun | B23K 26/0622 372/18 |
| 2011/0210105 A1* | 9/2011 | Romashko | B23K 26/0732 219/121.72 |

OTHER PUBLICATIONS

PCT Int'l App. No. PCT/US2014/049830 filed Aug. 5, 2014 Nov. 20, 2014—International Search Report and Written Opinion.

\* cited by examiner

LASER SYSTEM AND METHOD THEREOF

REFERENCE TO RELATED APPLICATIONS

This application claims the benefit of U.S. Application No. 61/862,233, filed Aug. 5, 2013, and U.S. Application No. 61/974,508, filed Apr. 3, 2014, each of which is hereby incorporated by reference in its entirety.

TECHNICAL FIELD

The present disclosure generally relates to a laser system and, more particularly, to a laser system configured to form laser induced channels in a substrate.

SUMMARY

In accordance with one or more embodiments, a laser system includes a laser configured to emit laser pulse bursts and a motion device in optical communication with the laser. The motion device is configured to deliver pulse bursts to a plurality of spaced apart locations along a substrate to form a laser induced channel in the substrate at one or more of these locations. The motion device has a first natural frequency sufficiently greater than an operating frequency of the laser system to prevent resonant vibration when the motion system operates to change the pulse burst delivery location among these locations at a constant speed.

In accordance with one or more embodiments, a method of separating a substrate into first and second pieces includes the steps of using a motion device to move a laser beam along the substrate and forming a laser induced channel in the substrate at each of a plurality of spaced apart locations. The motion device moves the laser beam along the substrate at a constant speed, S, and the plurality of spaced apart locations is along a curved path. The curve path has a minimum radius, r. The motion device is configured with a first natural frequency that is greater than a system operating frequency, $S/2\pi r$.

BRIEF DESCRIPTION OF THE DRAWINGS

Illustrative embodiments will hereinafter be described in conjunction with the appended drawings, wherein.

DETAILED DESCRIPTION

Figure 1:
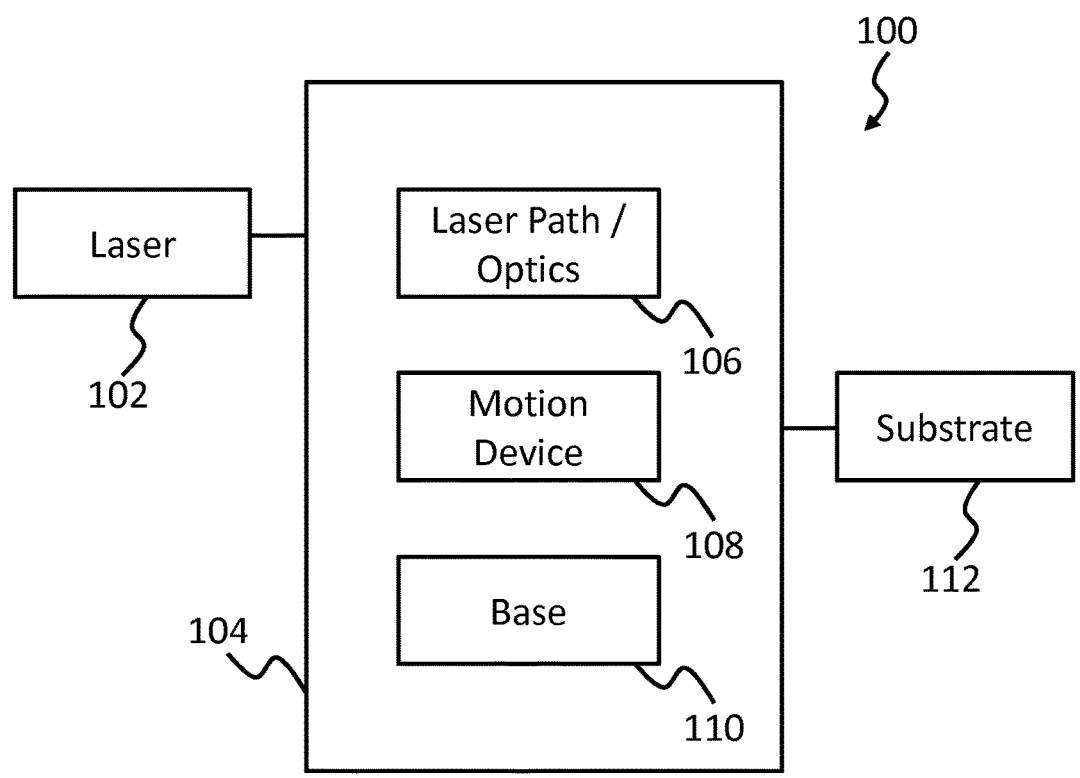
FIG. 1 is a block diagram of an embodiment of a laser system.

The present illustrated embodiments reside primarily in combinations of method steps and apparatus components related to a laser system and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In reference to FIG. 1, an embodiment of a laser system 100 is illustrated diagrammatically. The laser system 100 can include a laser 102 that is in optical communication with a laser delivery assembly generally indicated at reference identifier 104. The laser delivery assembly 104 can include a laser path or optics 106, a motion device 108 (x-axis motion, y-axis motion, and/or z-axis motion), and a base 110, and the laser delivery assembly 104 can be configured to direct a beam emitted from the laser 102 to a substrate 112, as described in greater detail herein.

The laser system 100 can be configured to form one or more laser induced channels in the substrate 112 at any one or more of a plurality of spaced apart locations. The substrate can be separated into at least first and second pieces along a plurality of such laser induced channels properly spaced along a desired line of separation. Examples of a laser system and products and one or more manners by which laser induced channels can be formed in a substrate are described in U.S. Patent Application Publication No. 2014/0036338, published on Feb. 6, 2014 and entitled "APPARATUS, METHOD, AND PROCESS WITH LASER INDUCED CHANNEL EDGE."

According to an embodiment, the laser system 100 is configured to operate at frequencies other than a natural frequency. For example, the laser system 100 can be configured so that a first (or fundamental) natural frequency is greater than an operating frequency of the laser system 100. In some embodiments, the first natural frequency of the motion device 108 is greater than the operating frequency of the laser system by an amount sufficient to prevent resonant vibration when the motion system operates to move the laser beam along the substrate at a constant speed. In one example, the natural frequency is approximately 10 to 20 times greater than the operating frequency of the laser system 100. In other embodiments, the natural frequency is in a range from 5 to 10 times the operating frequency, at least 5 times the operating frequency, at least ten times the operating frequency, or at least 20 times the operating frequency. In some cases, configuring the motion device 108 to have a natural frequency of at least 2 times or at least 2.5 times the operating frequency of the laser system is sufficient to prevent resonant vibration when the motion system operates. Configuring the motion device 108 and/or the laser system with this relationship between natural and operating frequencies can reduce the probability of exciting any natural frequencies during operation, thereby enhancing the accuracy of the laser system 100.

The base 110 can also be configured to reduce vibration, such as, but not limited to, including one or more dampening devices.

By way of explanation and not limitation, the operating frequency of the laser system 100 can be determined as a function of the speed at which the laser beam moves along the substrate, or a corresponding speed of a motion device component, along with a radius of curvature. In particular, the system operating frequency may be proportional to the speed and inversely proportional to the radius of curvature. It has been determined that the following relationship is useful to determine a system operating frequency:

$$\frac{S}{2\pi r}$$

where S is the speed at which the motion device moves the laser beam along the process path of the substrate, and r is a characteristic radius of the process path. In one example, the operating frequency at a 500 mm/sec process speed with a characteristic radius of 3 mm is approximately 26.5 Hz. Based on this, the motion device 108 can be configured with a first natural frequency according to the above-described relationship to prevent resonant vibration during operation. For instance, the motion device 108 can have a first natural frequency target of 265 Hz or higher, which is at least 10 times the operating frequency.

The system operating frequency may thus be considered a design parameter that depends on the particular shape of the laser process path and on the intended operating speed or process cycle time and can be used to help configure the motion device 108. As such, the characteristic radius r may be the smallest or minimum intended radius of process paths of which the laser system is desired to be capable, and the speed S may be the highest intended process speed. It has been determined that this manner of determining a system operating frequency and/or an associated minimum first natural frequency for the laser system may be particularly useful at a constant process speed along curved process paths, and even more particularly with relatively high process speed and relatively small radii. Conventional laser system motion devices or motion control systems may generally operate in a manner in which resonant vibrations are avoided by slowing the process speed at tight radii. The relationships among operating and natural frequencies and among process path geometry and speed disclosed herein enable high constant speed processing along tight radii. As described further below, constant speed processing can have several benefits with a laser process configured to produce laser induced channels in the substrate, and possibly with other laser processes.

Every natural frequency of a structure can have a unique shape (bending, torsion, etc.). According to an embodiment, the laser system 100 can be configured at least partially based upon a targeted value for a first natural frequency and a desired mode shape. The mode shape can be such that if a natural frequency is excited, the resulting vibrational motion can have a reduced effect on the laser process. For example, the laser system 100 can be configured for axial bending of a y-axis motion portion included in the motion device 108. In another example, the motion device can be configured so that the primary vibrational mode is in the z-axis direction, or the direction of laser propagation.

According to an embodiment, the laser system 100 can be configured to increase an acceleration of the motion device 108. One example for increasing acceleration of the motion device 108 is to reduce a mass of the motion device 108. The mass of the motion device 108 can include the mass of a structural portion, a tool portion, and/or a motor portion. The tool portion can include mirrors (e.g., turning mirrors), optics, etc. that can be configured to guide the beam emitted by the laser 102.

In some embodiments, configuring the natural frequency of the motion device 108 is determined with respect to a moving mass of the motion device 108 comprising the moving laser optics, such as the tool portion. For instance, the motion device may include a moving mass, such as the tool portion, coupled with a non-moving mass, such as the laser system base 110 or another structural portion. This moving mass may be the mass of interest when configuring the motion device to have a particular natural frequency with respect to the system operating frequency. For instance, decreasing the moving mass is one manner of increasing the natural frequency. Another manner of increasing the natural frequency is increasing the stiffness of the components that couple the moving mass with the non-moving mass. The particular direction(s) of increased stiffness can be selected to affect the natural frequency in different modes.

The laser system 100 can be configured to deliver laser pulses to the substrate 112 at a zero angle of incidence (e.g., approximately 90 degrees to a surface), according to an embodiment. Such an orientation can result in a cut line or separation surfaces (e.g., along a plurality of laser induced channels) that is normal to the surface of the substrate 112.

Additionally or alternatively, the laser system 100 can be configured to form a draft angle in the substrate 112. The draft angle can be a relatively small angle (e.g., a few degrees). A draft angle can be useful when separating the substrate into two or more pieces, such as to remove small internal structures of the substrate 112 (e.g., plug from a hole). In such cases, one of the pieces surrounds another of the pieces before they are separated. In such an embodiment, the laser system 100 can be configured to direct the beam along an axis normal to the substrate surface as it enters a final optic package and to tip the beam off-axis while substantially maintaining its position, such that it stays approximately within an operating envelope of the optics. The tool portion can include one or more turning mirrors that can include actuators and feedback devices for at least two axes to be coordinated along with a three linear axis motion system, such that the laser beam is angled relative to the substrate 112 and a centroid of a desired part shape.

According to an embodiment, a distance between laser induced channels formed in the substrate 112 can be at least partially related to a speed or velocity of the motion device 108, a laser pulse burst frequency, or a combination thereof. As used herein, the terms speed and velocity are used interchangeably and refer to the magnitude of the instantaneous velocity in the instant direction of travel. Thus, strictly speaking, a constant speed or velocity maintained around a turn or corner in the x-y plane may include reducing the speed in the particular direction of a machine axis and increasing the speed in the direction of a transverse machine axis.

Figure 2:
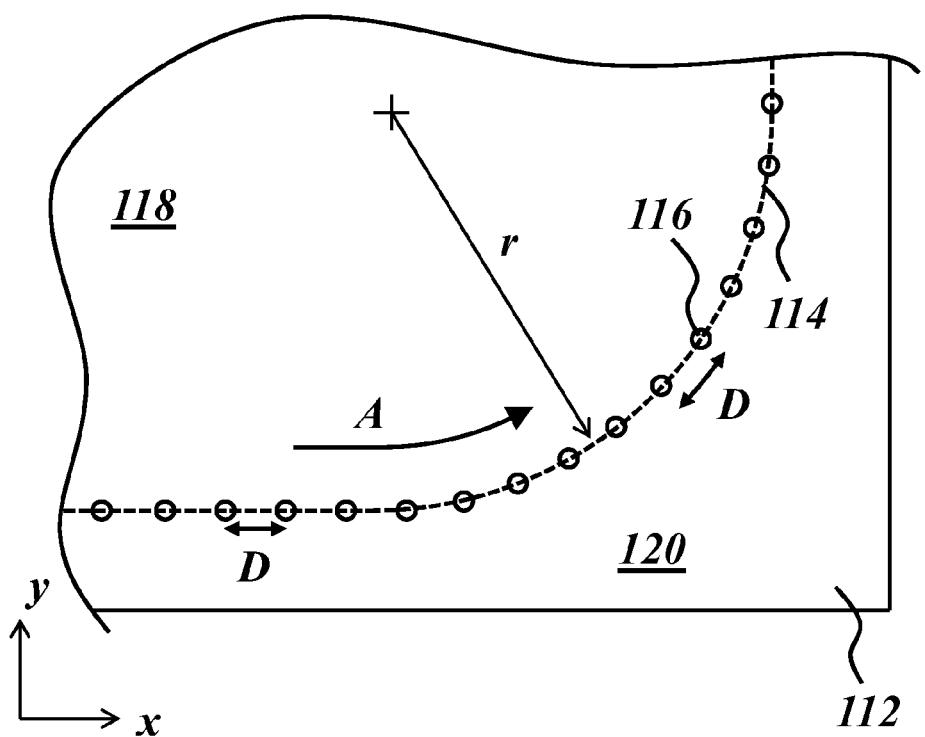
FIG. 2 is a view of a process path on a substrate surface along which laser induced channels may be formed in the substrate by embodiments of the laser system.

FIG. 2 is a view of the surface of a portion of the substrate 112 illustrating an example of a process path 114 along which a plurality of pulse burst delivery locations 116 may lie. A laser induced channel may be formed in the substrate 112 at one or more of such locations 116, and the substrate may be separated into first and second pieces 118 and 120. In the illustrated example, the distance D between adjacent locations 116 is constant. In other examples, D is non-constant or the distance D among one plurality of locations 116 is different from the distance among another plurality of locations. As used herein, the distance D refers to the length of the curvilinear process path between two locations as shown in FIG. 2. Thus the orthogonal distance in the x- and y-directions changes along the characteristic radius r when the distance D is constant along the radius.

As noted above, in conventional laser systems, laser motion device typical slows along curved portions of a process path, particularly with small radii. This not only slows process time, but also has the effect of making the spacing between adjacent locations along the process path smaller along tight radii when the laser system is configured to deliver pulse bursts at a constant burst frequency. For instance, in the example of FIG. 2, if the pulse burst frequency is 100 kHz and the process speed S is 500 mm/s, pulse bursts are delivered to the substrate 112 at a plurality of spaced apart locations 116 with a distance D=5 microns between adjacent locations. Constant spacing D can be advantageous when a plurality of laser induced channels is formed along the process path 114 to separate the substrate into more than one piece. For instance, a constant spacing D can provide a separated edge or separation surface with a more consistent roughness, appearance, or other quality metrics.

With modern pulsed lasers, available pulse burst frequencies of a particular laser are limited to discrete values, usually some multiple of a base frequency. It is therefore not usually possible to continually vary the burst frequency with a variable process speed to achieve equal location-to-location spacing D. One way of achieving the equal spacing D of FIG. 2 is to operate at a constant burst frequency and a constant speed for the entire length of the process path 114 where it is desired to have constant spacing between burst locations and/or laser induced channel locations. It is contemplated, however, that continuously variable laser burst frequencies may become available over time, and the disclosed laser system is not limited to constant pulse burst frequencies, nor are its advantages so limited. Attention to the configuration of the laser system and its components with respect to the system frequency relationships and other design parameters described herein offer at least the additional benefit of higher process speeds.

The motion device 108 can be configured to operate at a plurality of velocities, wherein each of the plurality of velocities can be for a designated function, such that the motion device 108 is configured to operate at a constant velocity for each function. In one embodiment, the laser system and/or the laser is configured to operate at a plurality of discrete burst frequencies, and the motion device is configured to operate at a plurality of speeds such that the spacing among the plurality of locations can be the same with more than one combination of burst frequency and speed.

For purposes of explanation and not limitation, the motion device 108 can move at a first constant velocity when the laser system 100 is forming laser induced channels in a first orientation (e.g., large radii, no radii, etc.), and the motion device 108 can move at a second constant velocity when the laser system 100 is forming laser induced channels in a second orientation (e.g., small radii). Thus, the laser system 100 is configured to change speeds of the motion device 108, a laser pulse burst frequency, or a combination thereof to form shapes of different radii in the substrate 112. In such an example, the laser system 100 can be configured to space the laser induced channels in different shapes within a desired processing time.

The laser system 100 can be configured to form a plurality of laser induced channels in the substrate 112 that are approximately equally spaced (e.g., 5 micron spacing, 10 micron spacing, etc.). The spacing of the laser induced channels can be based upon a speed of the motion device 108 being correlated to a frequency of the laser pulse bursts, according to an embodiment. The motion system 112 can be configured to have a constant velocity in such turns for corners, so that a relationship with the laser pulse burst can be approximately maintained. Examples of velocities are, but not limited to 500 mm/sec, 250 mm/sec, and 125 mm/sec.

Figure 3:
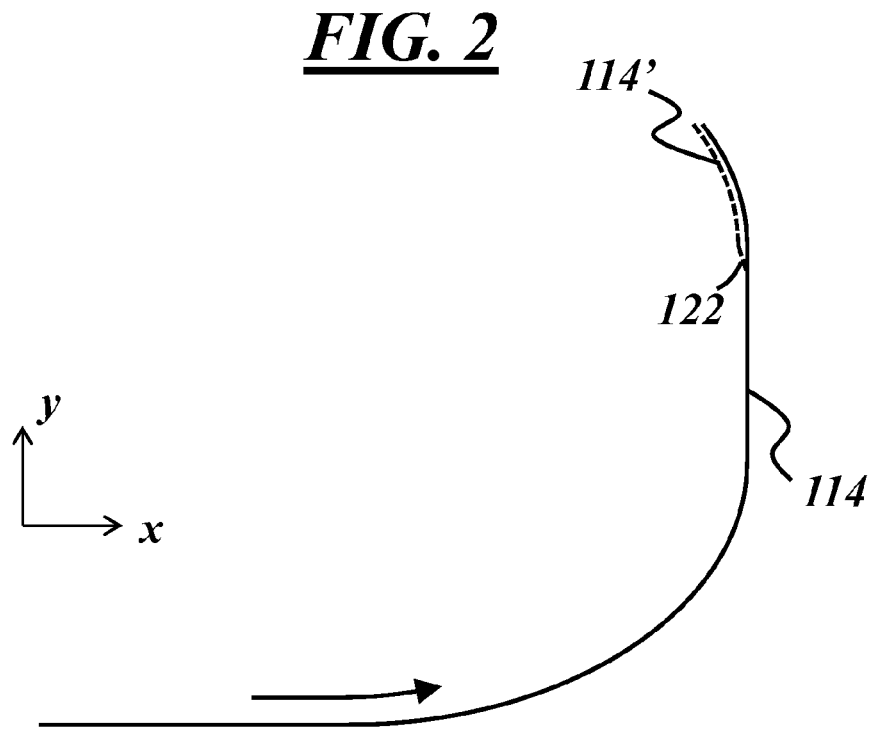
FIG. 3 illustrates process paths resulting from a motion system including an air bearing and from a motion system including a ball bearing.

With reference to FIG. 3, a process path 114 is illustrated that includes a change from a first direction to an opposition direction. In particular, the motion device moves the laser in the positive x-direction (to the right in FIG. 3), turns toward the y-direction, and then moves the laser in the negative x-direction. The dashed line represents a process path 114' that may result at such a direction change where the motion device employs a conventional ball bearing system to couple and/or support motion device components that must move relative to one another. This process path 114' includes an example of a following error defect 122. With ball bearing system, the change in direction involves at least some balls of the bearing system rolling in one direction and changing to roll in the opposite direction. The change in rolling direction must transition through a point of zero movement, at which time the coefficient of friction between the ball and support surface increases, as a result of static friction being greater than dynamic friction. The momentary change in friction causes a stick-and-slip condition, leading to the illustrated defect 122.

The relative size of this type of defect 122 is often not noticeable in conventional laser motion systems. For instance, with laser cutting or welding systems that liquefy or vaporize metal as part of the process, the heat affected zone can be many times larger than the following error so that no defect is effectively formed. The use of a laser to form laser induced channels in the substrate 112, however is very accurate and precise. In such a process, essentially zero material is removed from the substrate, making the following error defect noticeable.

According to at least one embodiment, the motion device 108 can include an air bearing system comprising an air bearing. An air bearing uses a cushion of pressurized air at the interface between moveable components instead of metal balls, reducing friction and any change in frictional properties due to the momentary stoppage in motion association with a directional change in the process path. The process path 114 depicted with a solid line in FIG. 3, with no noticeable following defect may result with the use of an air bearing system. In some embodiments, the air bearing system also decreases the mass of a motion device component compared to a ball bearing system, thus potentially offering the additional advantage of an increased first natural frequency of the motion device with the above-described benefits associated therewith.

It should be appreciated by those skilled in the art that the components described herein can be combined in additional or alternative ways not explicitly described. It should further be appreciated by those skilled in the art that the system described herein can perform one or more methods and/or produce one or more products by such a process.

It will be appreciated that embodiments of the invention described herein may be comprised of one or more conventional processors and unique stored program instructions that control one or more processors to implement, in conjunction with certain non-processor circuits, some, most, or all of the functions of a laser system and method thereof, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A laser system comprising:
a laser configured to emit laser pulse bursts; and
a motion device in optical communication with said laser and configured to deliver said laser pulse bursts to a plurality of spaced apart locations along a substrate to form a laser induced channel in the substrate at one or more of said plurality of spaced apart locations;
wherein said motion device has a natural frequency greater than an operating frequency of the laser system to prevent resonant vibration when the motion device operates to change delivery location of the laser pulse bursts among said plurality of spaced apart locations at a constant speed.

2. The laser system of claim 1, wherein said natural frequency is at least 5 times the operating frequency.

3. The laser system of claim 1, wherein said natural frequency is at least 10 times the operating frequency.

4. The laser system of claim 1, wherein the laser operates at a constant burst frequency such that said plurality of spaced apart locations are equally spaced when the motion device operates at the constant speed.

5. The laser system of claim 4, wherein the distance between the equally spaced plurality of spaced apart locations is in a range from 2 microns to 7 microns.

6. The laser system of claim 1, wherein the constant speed is at least 125 mm/sec.

7. The laser system of claim 1, wherein the constant speed is in a range from 125 mm/sec to 500 mm/sec.

8. The laser system of claim 1, wherein the constant speed is at least 500 mm/sec.

9. The laser system of claim 1, wherein said plurality of spaced apart locations lie along a curvilinear path.

10. The laser system of claim 1, wherein said operating frequency is determined by the following relationship:

$$\frac{S}{2\pi r}$$

wherein S is the constant speed and r is smallest radius of a curvilinear path along which the plurality of spaced apart locations lies.

11. The laser system of claim 1, wherein said natural frequency is determined with respect to a moving mass of the motion device comprising moving laser optics.

12. The laser system of claim 1, wherein the motion device comprises an air bearing.

13. The laser system of claim 1, wherein the laser is configured to operate at a plurality of discrete burst frequencies and the motion device is configured to operate at a plurality of speeds such that the spacing among the plurality of spaced apart locations is the same with more than one combination of the plurality of discrete burst frequencies and the plurality of speeds.

14. A method of separating a substrate into first and second pieces, comprising the steps of:
using a motion device to move a laser beam along the substrate at a constant speed, S, among a plurality of spaced apart locations along a curved process path having a minimum radius, r; and
forming a laser induced channel in the substrate at each of said plurality of spaced apart locations,
wherein the motion device is configured with a natural frequency that is greater than a system operating frequency, $S/2\pi r$.

15. The method of claim 14, wherein said natural frequency is at least 5 times said operating frequency.

16. The method of claim 14, wherein the laser operates at a burst frequency such that the spacing among said plurality of spaced apart locations is constant along said path.

17. The method of claim 14, wherein said operating frequency is in a range from about 6.6 Hz to about 26.5 Hz.

18. The method of claim 14, wherein said natural frequency is at least 66 Hz.

19. The method of claim 14, wherein the laser beam is tipped off-axis to form the laser induced channels at a draft angle.

20. The method of claim 19, wherein the first piece is an internal structure of the substrate such that the second piece surrounds the first piece before the pieces are separated.

* * * * *